United States Patent

Miller, II

[11] Patent Number: 6,075,861
[45] Date of Patent: *Jun. 13, 2000

[54] SECURITY ACCESS SYSTEM

[75] Inventor: Robert Raymond Miller, II, Morris Township, Morris County, N.J.

[73] Assignee: AT&T Corp., New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/657,448

[22] Filed: May 29, 1996

[51] Int. Cl.$^7$ ....................................................... H04L 9/32
[52] U.S. Cl. ................................. 380/28; 380/21; 380/23; 380/25; 235/380
[58] Field of Search ..................... 380/3, 21, 23, 380/25, 28; 235/380

[56] References Cited

U.S. PATENT DOCUMENTS

| | | |
|---|---|---|
| 4,471,216 | 9/1984 | Herve . |
| 4,652,698 | 3/1987 | Hale et al. ............................ 380/28 X |
| 5,056,140 | 10/1991 | Kimbell . |
| 5,065,429 | 11/1991 | Lang ...................................... 380/23 X |
| 5,163,097 | 11/1992 | Pegg ...................................... 380/23 X |
| 5,191,611 | 3/1993 | Lang ...................................... 380/23 X |
| 5,341,428 | 8/1994 | Schatz . |
| 5,363,425 | 11/1994 | Mufti et al. . |
| 5,367,572 | 11/1994 | Weiss ........................................ 380/23 |
| 5,473,689 | 12/1995 | Eberhard ................................... 380/23 |
| 5,757,918 | 5/1998 | Hopkins ................................... 380/25 |

FOREIGN PATENT DOCUMENTS

| | | |
|---|---|---|
| 0 484 686 | 5/1992 | European Pat. Off. . |
| 94 01963 | 1/1994 | WIPO . |
| 97 18653 | 5/1997 | WIPO . |

*Primary Examiner*—Max Noori
*Attorney, Agent, or Firm*—Alfred G. Steinmetz

[57] ABSTRACT

An entry access system includes a locking mechanism enabling authorized entry at a secured entry point to a closed access area or computing device. Entry is approved in response to an interaction between an intended entrant and the entry access system that involves an interchange of multidigit numbers and use of ID and PINs for generation of a multidigit check number to establish authenticity of a request for entry.

8 Claims, 2 Drawing Sheets

SECURITY ACCESS SYSTEM

FIELD OF THE INVENTION

This invention relates to secure access entry systems and in particular to such a system based on a use of telephones and telephone systems including; cellular, PCS wireless, public switched telephone systems, wired telephone systems all in combination with the use of a smart card for storage of access information.

BACKGROUND OF THE INVENTION

A secured access entry is effective to prevent unauthorized entry only to the extent that an intruder is unable to reconstruct any authorized entry means of access such as a key, a combination, a password, etc. If the entry means is relatively simple to enhance the performance of an authorized entrant it is too often ascertained by an unauthorized entrant for unauthorized entry. On the other hand a sophisticated complicated entry means may inadvertently defeat even the authorized entrant. It is necessary to devise an entry authorization system for entry that is friendly to authorized entrants and yet able to defeat unauthorized entry attempts.

In another aspect the entry means may operate by a transmission of passwords over an insecure transmission facility. The protection afforded may be compromised by interception of this information by an unauthorized recipient.

SUMMARY OF THE INVENTION

An entry access system includes a locking mechanism enabling authorized entry at a secured entry point to a closed access area or computing device. Entry is approved in response to an interaction between a intended entrant and the entry access system that involves an interchange of ID and PINs and generation of a multidigit number encrypted to establish a relation between valid ID and PIN combinations. Transmission of ID and related numbers is encrypted internally at both ends so that interception of the number is useless to an unauthorized intercepting recipient.

In a particular embodiment an intended entrant/user accesses a system ID in a personal communicator by entering or enabling entry of a PIN number into the device. A smart card, in one preferred embodiment, is inserted into the personal communicator and provides the ID number which the user accesses by entry of the PIN which is compared to a PIN stored in the card. The communicator is connected by telephone link to the entry access system by dialing of the communicator user or automatically in response to the smart card. The entry access system correlates the received ID number with a PIN stored in its data base. An arbitrary multidigit number is constructed from the received ID number and transmitted to the communicator.

At the communicator the multidigit number is received and a new number is generated from the ID number using encryption algorithm techniques with the PIN as a key. The new number is retransmitted back to the entry access system where a check number is generated, using the same encryption algorithm with the new number, and using the PIN as a key. The check number is compared with the original generated arbitrary number. If they match access is granted to the entry applicant.

The generated numbers may be transmitted openly between stations without compromising system security since the encryption processes are limited to internal processes at each end. Attainment of the transmitted numbers through interception by an unauthorized recipient is of no value in gaining access to the secure area.

DETAILED DESCRIPTION

Figure 1:
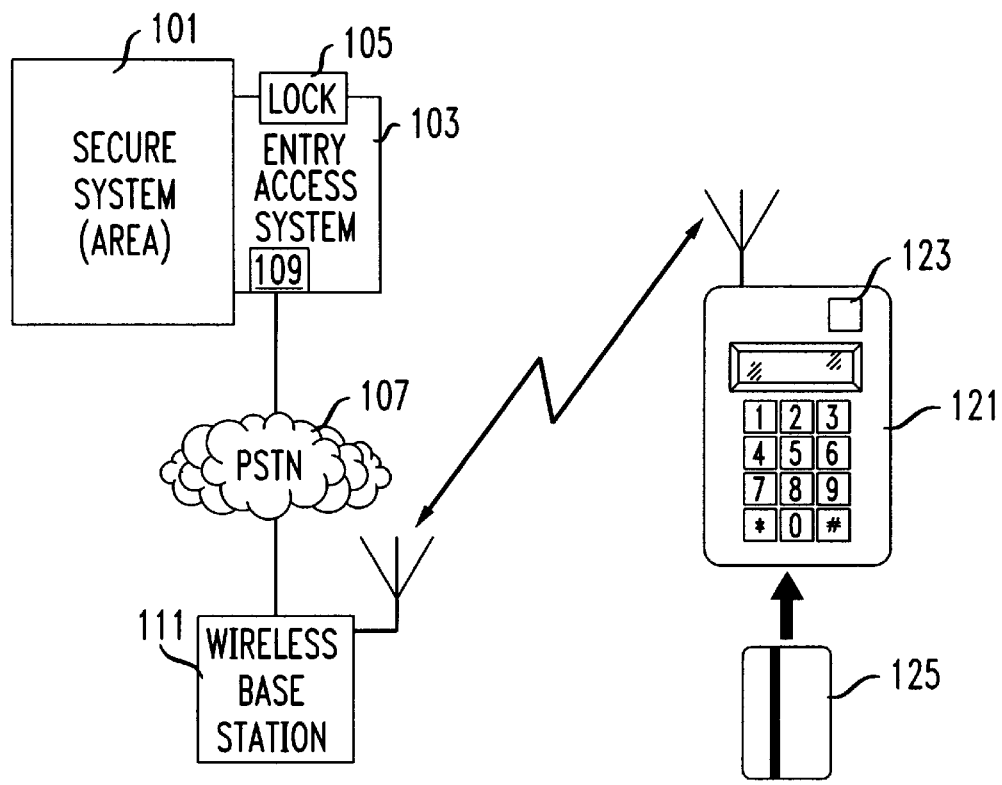
FIG. 1 is a schematic of a secured access system according to the principles of the invention.

A secured system shown in FIG. 1 has an area, computer or data storage 101 which is secured from entry by the entry access system 103 which controls a locking mechanism 105 which needs to be released before a user can gain access to the interior of the secure system (i.e., area). The entry access system includes a telephone station set 109 connected to the public switched telephone network (PSTN) 107.

The PSTN 107 is connected to a wireless base station 111. The user desiring entry to the secure system 101 in the illustrative embodiment has a mobile communicator 121 in wireless communication with the wireless base station 111. Communicator 121 preferably has a touch tone decoder 123 for receiving and transmitting numbers as Dual Tone Multifrequencies (DTMF) dual frequencies. The invention is not limited to wireless communication but may communicate, in the alternative, through a wired station set external to the secure area. The communicator is arranged to accept a smart card 125 which includes data storage relevant to the card holder. The smart card may include information such as an ID number, a PIN (i.e., also stored at the entry access system) or other information relevant to the user. In the alternative, to a smart card, certain of this information may be entered by the user through the communicator keyboard.

Figure 2:
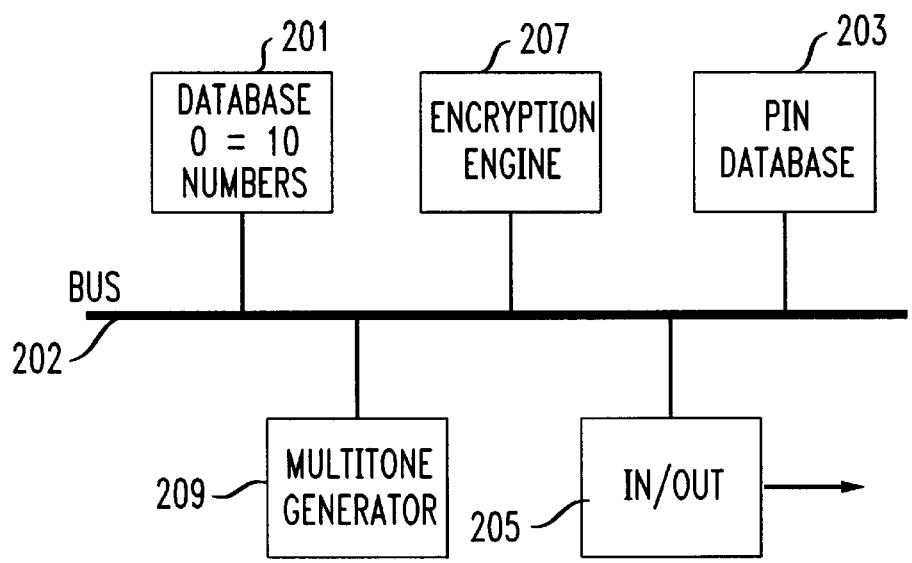
FIG. 2 is a schematic of a protocol arrangement included in the entry access system for allowing access according to the principles of the invention.

A more detailed disclosure of the entry access system is shown in the FIG. 2. The entry access system includes a stored data base 201 of ID numbers of the authorized entrants to the secure system. This is connected to the bus 202. Also connected to the bus are a data base 203 of PIN numbers of authorized entrants and in/out unit 205 for connecting to a subscriber telephone set of the entry access system. An encryption engine 207 is operative for examining input PIN and ID numbers and generating a arbitrary multidigit number. This number is converted to DTMF multitones by the generator 209 in the illustrative embodiment for transmission, via the in/out unit 205 and telephone network to the user's communication unit.

The multidigit number returned to the entry access system from the communicator is applied the encryption engine 207 which compares it with the original transmitted number. If the two compare a signal is transmitted through the in/out unit to admit access to the user.

Figure 3:
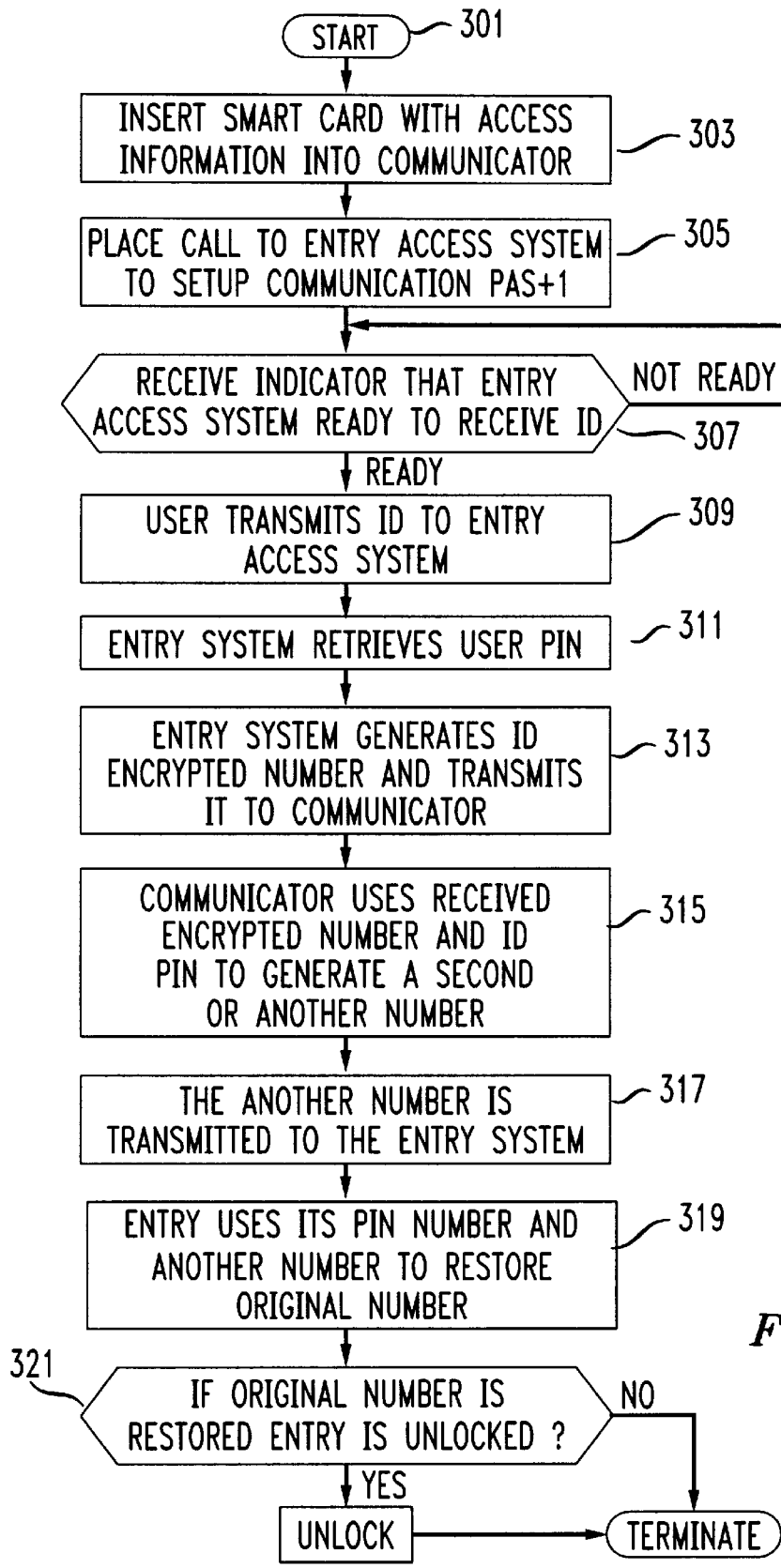
FIG. 3 is a flow chart illustrating a process in which the entry access system operates.

An illustrative process by which entry is approved into the system is shown schematically in the flow process chart of FIG. 3. Beginning at the start, terminal 301, the flow proceeds to execute the instructions of block 303 reflecting the action of the user of inserting user's smart card, which contains user relevant information such as the user's PIN, into the personal communicator or communication device, which may be a cellular telephone or PCS communicator.

A subsequent instruction illustrated in block 305 has the user place a call to an entry point telephone receiver contained in the entry point access system. This receiver responds, as per the instructions of block 307 to indicate readiness to receive a transmitted ID number of the user as indicated. If the system is not ready at this time the flow returns to the input of block 307 until the ID number can be received. Indications of readiness may be by audio return or by display on the display of the communicator.

Upon the readiness to receive state being indicated the user ID is transmitted to the entry point receiver as indicated by the instructions of block 309. Upon receipt of the user ID the entry point system retrieves the related PIN from its own data base as indicated by the instructions indicated in block 311. The entry point encryption engine utilizes the ID number to formulate a multidigit number and transmits this number to the user's communicator as indicated by the instructions of block 313. The user's communicator includes encryption circuitry which generates another number from the received number and the user's PIN as indicated by the instructions of block 315. The user's PIN may be entered directly by user or recovered from an inserted smart card.

The communicator generated check number is returned to the entry point, as indicated in block 317; and at the entry point system the originally generated arbitrary multidigit number is acted upon by the encryption engine in combination with the stored PIN at the entry point to regenerate a check number by the entry point system as per block 319. If the regenerated check number is identical to the original check number the entry is unlocked as per decision block 321. If the numbers do not match the process is terminated leaving the entry locked.

While a particular process and apparatus have been illustratively disclosed other variations may be implemented with departing from the spirit and scope of the invention. In one alternative embodiment the number of the entry point would be released only by application of the PIN releasing the number as stored on the smart card. While the communicator is shown as wireless the process may be implemented using a sired communication connection.

Another variation would include a timeout period in which to enter valid information, after which the system is disabled or the process terminated.

The invention claimed is:

1. A method of authenticating an authorization of access to a secure system/location through entry access control system in response to a protocol process, comprising the steps of:

providing a user/prospective entrant with a system ID number and a personal PIN number;

including the ID number and PIN number in a database accessible to the access entry control system;

providing an identical encryption algorithm to both the user/prospective entrant and the access entry control system;

storing the ID number and PIN number in a communication device in the possession of the user/prospective entrant;

transmitting the ID number to the access entry control system from the communication device at the access entry control system receiving the transmitted ID number and generating an arbitrary multidigit number from the ID number;

transmitting the arbitrary multidigit number to the communication device;

at the communication device generating a check number with the encryption algorithm using the arbitrary multidigit number, and using the PIN number as a key;

transmitting the check number generated at the communication device to the access entry control;

generating a second check number at the access entry control system with the encryption algorithm using arbitrary multidigit number, using the PIN number as a key and comparing the check number generated at the communication device with the second check number generated at the entry access control system; and granting access to the user/prospective entrant if the second check number is identical to the check number generated at the communication device.

2. The method of claim 1, wherein the step of:

storing the PIN number in the communicator is performed through use of a smart card inserted into the communicator.

3. The method of claim 1, wherein the steps of:

transmitting includes a wired telephone connection.

4. The method of claim 1 wherein the step of:

transmitting includes a wireless telephone connection.

5. An access entry control system having an entry admittance system for enabling entrance to a secure facility, the entry access control system operating in response to number exchanges between a prospective entrant and the entry admittance system, the numbers including ID and PIN numbers and generated numbers in the number exchange process, the system comprising:

a communication link for permitting communication between the entry admittance system and the prospective entrant; including a communicator device for the prospective entrant and a communication device for the entry admittance system;

the communication device for the prospective entrant located external to the secure facility; including access to an ID of the entry access control system and a PIN number assigned to a user of the communication device seeking access to the secure facility and generating a check number;

the communication system for the entry admittance system located nearby and controlling an entry access mechanism of the secure facility and also including an arbitrary number generator and an encryption algorithm for creating numbers using a PIN number as a key;

the encryption algorithm generating a check number at the prospective entrants' communication device from the arbitrary number and using the PIN as a key; and the encryption algorithm generating a check number at the entry admittance system from the arbitrary number and using the PIN as a key; and the access entry control operative for granting access when check numbers generated at the communication device of the prospective entrant and at the access entry admittance system are in agreement, and the entry access mechanism responsive to effectuate the granting of access.

6. The entry access control system of claim 5, comprising:

the communication device for the prospective entrant which is a wireless communication device.

7. The entry access control system of claim 5, comprising:

the communication system for the entry admittance system which includes a connection to a PSTN network system.

8. The entry access control system of claim 5, comprising:

a multitone generator for transmitting ID numbers.

* * * * *